United States Patent
Kageyama

[11] Patent Number: 6,038,405
[45] Date of Patent: Mar. 14, 2000

[54] AUTOMATIC FOCUS DETECTION DEVICE

[75] Inventor: Kazumi Kageyama, Sakai, Japan

[73] Assignee: Minolta Co., Ltd., Osaka, Japan

[21] Appl. No.: 09/164,307

[22] Filed: Oct. 1, 1998

[30] Foreign Application Priority Data

Oct. 3, 1997 [JP] Japan .................................. H9-271264

[51] Int. Cl.⁷ .................................................. G03B 13/36
[52] U.S. Cl. ........................... 396/92; 396/123; 396/100; 396/148
[58] Field of Search .................................. 396/81, 80, 79, 396/84, 92, 121, 122, 123, 124, 100, 148, 149

[56] References Cited

U.S. PATENT DOCUMENTS

| | | | |
|---|---|---|---|
| 5,051,767 | 9/1991 | Honma et al. ........................... | 354/406 |
| 5,305,046 | 4/1994 | Sato ........................................ | 396/123 |
| 5,623,707 | 4/1997 | Kusaka ................................... | 396/123 X |

*Primary Examiner*—W. B. Perkey
*Attorney, Agent, or Firm*—Morrison & Foerster LLP

[57] ABSTRACT

A distance measurement device has a taking lens, a viewfinder, distance measurement elements for performing distance measurement in a plurality of areas on an object, a memory for storing the positional relationship between the field of view of the viewfinder and the distance measurement areas of the distance measurement elements, a selector for selecting one of the distances measured in the plurality of areas in accordance with the positional relationship stored in the memory, and a controller for adjusting the focus of the taking lens in accordance with the distance selected by the selector.

12 Claims, 11 Drawing Sheets

AUTOMATIC FOCUS DETECTION DEVICE

This application is based on application No. H09-271264 filed in Japan, the content of which is hereby incorporated by reference.

BACKGROUND OF THE INVENTION

1. Field of the Invention

The present invention relates to an automatic focus detection device for use in a camera, and more particularly to an automatic focus detection device in which the optical axis of the focus detection optical system does not coincide with the optical axis of the viewfinder optical system.

2. Description of the Prior Art

Some conventional cameras, in particular lens-shutter cameras, are equipped with an automatic focus detection device in which the optical axis of the focus detection optical system does not coincide with the optical axis of the viewfinder optical system. With this type of automatic focus detection device, it is inevitable that the distance measurement point moves relative to the viewfinder screen or the distance measurement frame depending on the distance to the object, according to the angle of view that varies with the zooming of the taldng optical system, or due to mechanical assembly errors.

As a result, it often occurs that, when a photographer shoots a picture using the center of the viewfinder screen as the reference point as one would normally do, the above-mentioned variation in the positional relationship causes the distance measurement point to deviate from where it should be, and thus causes distance measurement to be performed at a point not intended by the photographer. Moreover, in particular in multiple-point distance measurement, it sometimes occurs that, as the focal length becomes greater as the result of zooming, the distance measurement points located at the edges of the screen get out of the distance measurement frame or even out of the viewfinder screen. Distance measurement performed at such points may lead to extremely incorrect measurement results, making the obtained picture completely out of focus.

To solve this problem, various modifications have been proposed for automatic focus detection devices. For example, Japanese Laid-Open Patent Application No. H2-293833 discloses a passive-type automatic focus detection device that is additionally provided with a control means for varying the actually used portion of a line sensor used as a distance measurement sensor in accordance with the focal length of the taking optical system or the distance to the object. Purportedly, this makes it possible to detect focus for an object that is located in a fixed position or in a fixed range within the shooting screen regardless of the distance to the object.

However, this structure is applicable only to passive-type automatic focus detection devices. Moreover, the position and range of the distance measurement zone are seriously affected by the width and arrangement of the line sensor. Furthermore, mechanical assembly errors are still inevitable and may lead to a product defect in which the position of the distance measurement point cannot always be set accurately relative to the viewfinder screen or the distance measurement frame.

SUMMARY OF THE INVENTION

An object of the present invention is to provide an automatic focus detection device that can recognize the positional relationship between the viewfinder and the distance measurement point accurately and that can focus on the point actually intended by the photographer.

To achieve the above object, according to one aspect of the present invention, a distance measurement device is provided with: a taking lens; a viewfinder; distance measurement elements for performing distance measurement in a plurality of areas on an object; a memory for storing the positional relationship between the field of view of the viewfinder and the distance measurement areas of the distance measurement elements; a selector for selecting one of the distances measured in the plurality of areas in accordance with the positional relationship stored in the memory; and a controller for adjusting the focus of the taking lens in accordance with the distance selected by the selector.

According to another aspect of the present invention, a focus detection device is provided with: a taking lens; a viewfinder; focus detection elements for performing focus detection in a plurality of areas on an object; a memory for storing the positional relationship between the field of view of the viewfinder and the focus detection areas of the distance measurement elements; a selector for selecting one of the focus detection results obtained in the plurality of areas in accordance with the positional relationship stored in the memory; and a controller for adjusting the focus of the taking lens in accordance with the focus detection result selected by the selector.

BRIEF DESCRIPTION OF THE DRAWINGS

This and other objects and features of the present invention will become clear from the following description, taken in conjunction with the preferred embodiments with reference to the accompanied drawings in which.

DESCRIPTION OF THE PREFERRED EMBODIMENTS

Figure 1:
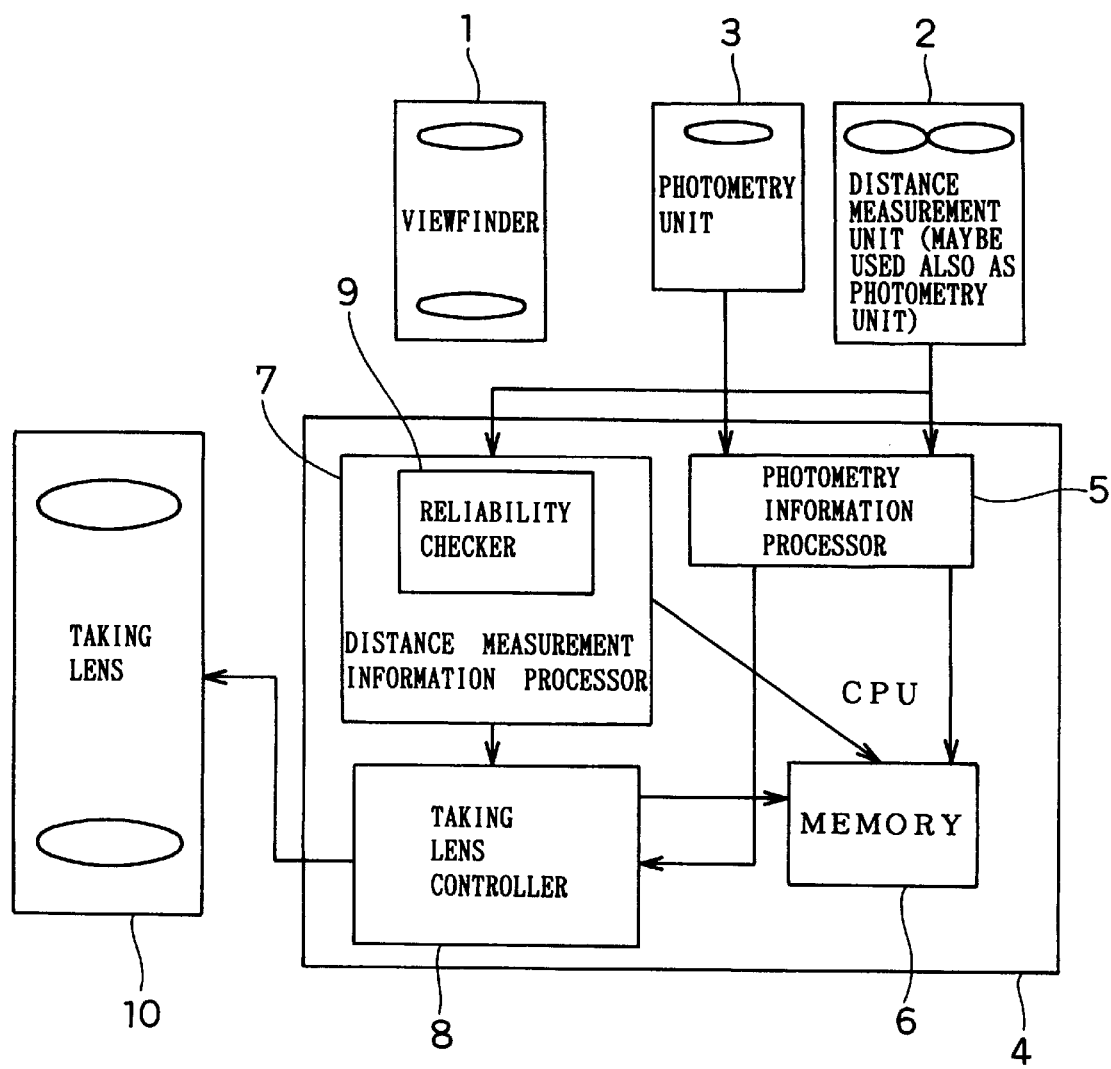
FIG. 1 is a block diagram illustrating an example of the control system used in an automatic focus detection device embodying the invention.

Hereinafter, embodiments of the present invention will be described with reference to the drawings. FIG. 1 shows a block diagram of an example of the control system used in an automatic focus detection device embodying the invention. In this figure, numeral 1 represents a viewfinder, numeral 2 represents a distance measurement unit (focus detection optical system), and numeral 3 represents a photometry unit. The viewfinder 1 and the distance measurement unit 2 are built as separate units, and each has its own optical axis. It is possible to use the distance measurement unit 2 also for photometry. Numeral 4 represents a controller built, for example, as a microcomputer. The controller 4 is composed of a photometry information processor 5, a memory 6, a distance measurement information processor 7, and a taking lens controller 8, and the distance measurement information processor 7 includes a reliability checker 9.

As shown in FIG. 1, the distance measurement information obtained in the distance measurement unit 2 is converted into a value representing the measured distance by the distance measurement information processor 7, and then the reliability of the data is checked by the reliability checker 9. The thus obtained distance measurement data is transmitted to the taking lens controller 8. Based on this data, the taking lens controller 8 drives the taking lens 10 to be focused, and performs other operations. Similarly, the photometry information obtained in the photometry unit 3 is converted into a value representing the measured brightness by the photometry information processor 5, and the thus obtained photometry data is transmitted to the taking lens controller 8. Based on this data, the taking lens controller 8 performs exposure and other operations.

In cases where the distance measurement unit 2 is used also for photometry, the photometry information obtained in the distance measurement unit 2 is transmitted to the photometry information processor 5. In addition, the distance measurement data obtained in the distance measurement information processor 7, the photometry data obtained in the photometry information processor 5, and the control data obtained in the taking lens controller 8 under those conditions are transmitted to the memory 6 so as to be stored therein. This makes it possible to store the positional relationship between the viewfinder and the distance measurement points. The distance measurement unit 2 performs distance measurement by a method based on triangulation, such as the so-called infrared active method in which distance information is obtained by measuring the deflection angle between an infrared light beam emitted to an object and the beam reflected from the object, or the so-called passive method in which coincidence of two images is checked by means of a pair of divided sensors (light-sensing elements).

In the structure described above, when multiple-point distance measurement is performed, distance measurement points are selected in the following manner. Note that, in the examples shown in FIGS. 2 to 5 that are referred to in the following descriptions, the above-mentioned infrared active method is adopted as an example. As shown in these figures, in these examples, the distance measurement unit 2 is provided with a light emitter 11 and a light sensor 12, and distance measurement is performed by emitting from the light emitter 11 five light beams toward the object and receiving by the light sensor 12 the light beams reflected from the object.

Figure 2:
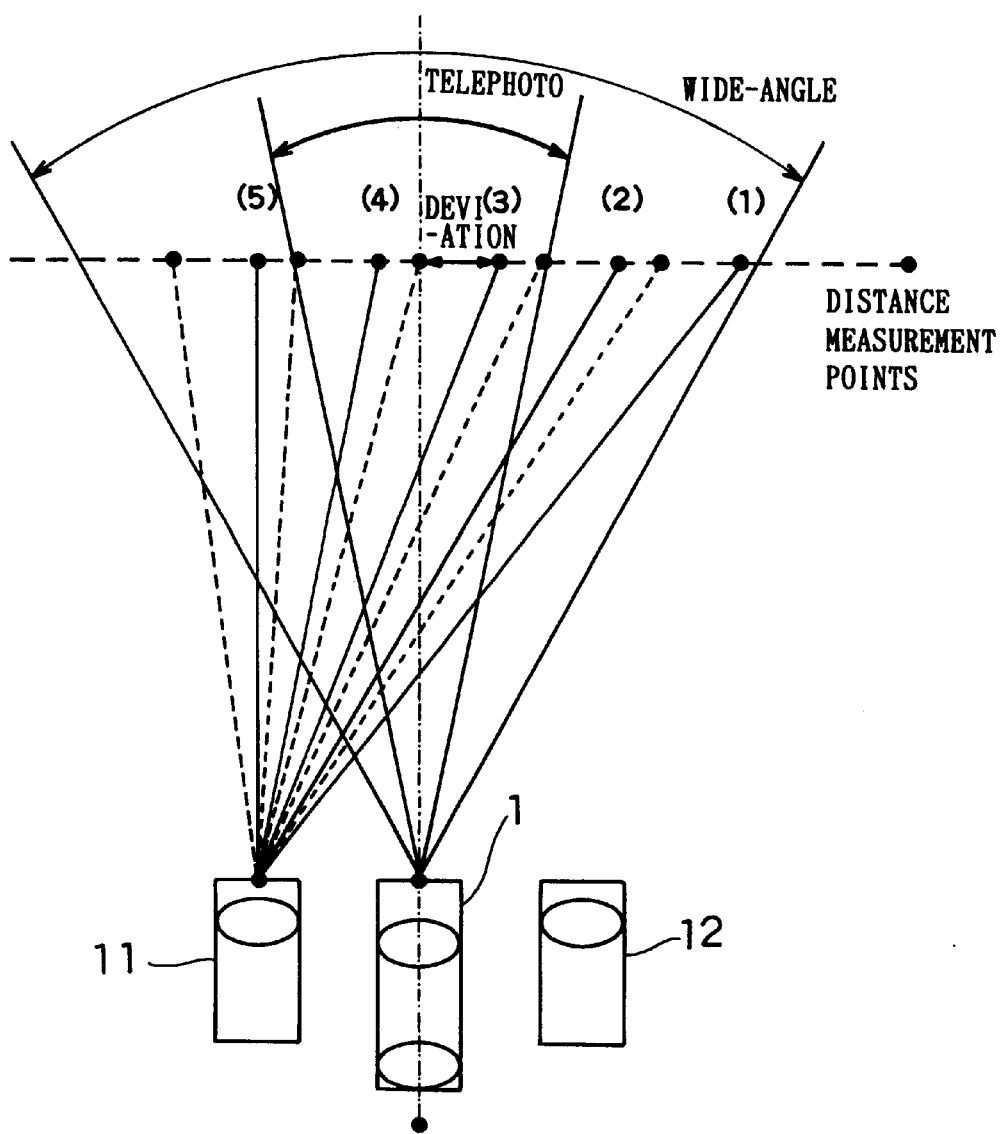
FIG. 2 is a diagram illustrating how distance measurement points are selected in accordance with the focal length.

FIG. 2 illustrates how distance measurement points are selected in accordance with the focal length. In this figure, the five light beams emitted from the light-emitter 11 to obtain distance measurement points (1) to (5) on the object when there is no deviation between the central distance measurement point (3) and the center of the viewfinder 1 are indicated by broken lines, whereas the light beams emitted when there is a deviation are indicated by solid lines. As shown in this figure, as zooming is performed from the wide-angle end to the telephoto end, the field of view of the viewfinder varies accordingly. As a result, the central distance measurement point and the selectable distance measurement points change as shown in Table 1 below.

TABLE 1

|  | Central Distance Measurement Point | Selectable Distance Measurement Points | |
| --- | --- | --- | --- |
|  |  | Wide-Angle End | Telephoto End |
| Not Deviated (Broken Lines) | (3) | (1)–(5) | (2)–(4) |
| Deviated (Solid Lines) | (4) | (1)–(5) | (3), (4) |

Figure 3:
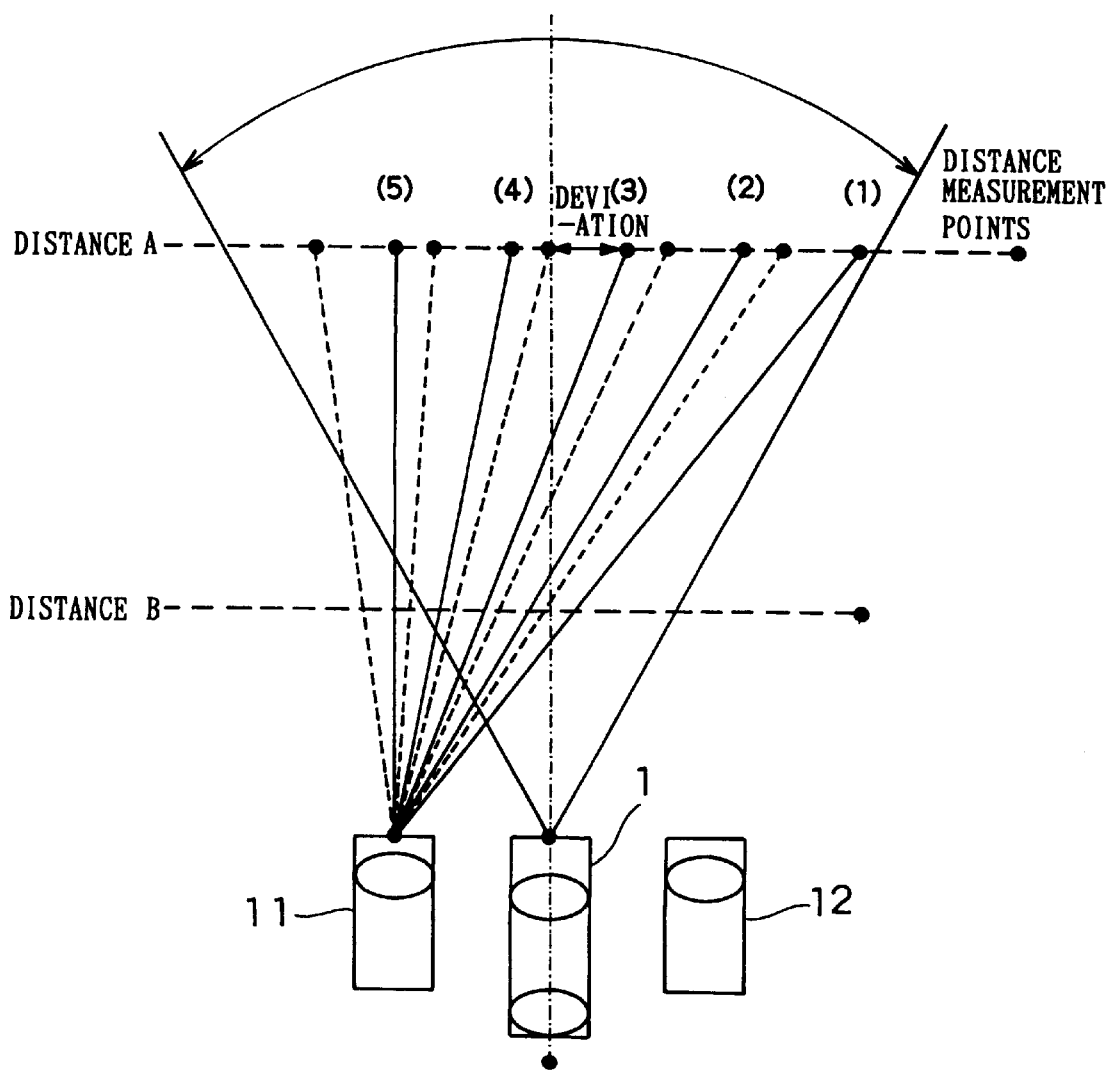
FIG. 3 is a diagram illustrating how distance measurement points are selected in accordance with the object distance.

FIG. 3 illustrates how distance measurement points are selected in accordance with the object distance. In this figure, the five light beams emitted from the light-emitter 11 to obtain distance measurement points (1) to (5) on the object when, at the distance A, there is no deviation between the central distance measurement point (3) and the center of the viewfinder 1 are indicated by broken lines, whereas the light beams emitted when there is a deviation are indicated by solid lines. As shown in this figure, as the object distance varies from the distance A to the distance B with the field of view of the viewfinder kept fixed, the central distance measurement point and the selectable distance measurement points change as shown in Table 2 below.

TABLE 2

|  | Central Distance Measurement Point | | Selectable Distance Measurement Points |
| --- | --- | --- | --- |
|  | Distance | | |
| Not Deviated (Broken Lines) | A | (3) | (1)–(5) |
|  | B | (1) | (1)–(3) |
| Deviated (Solid Lines) | A | (4) | (1)–(5) |
|  | B | (2) | (1)–(4) |

Figure 4:
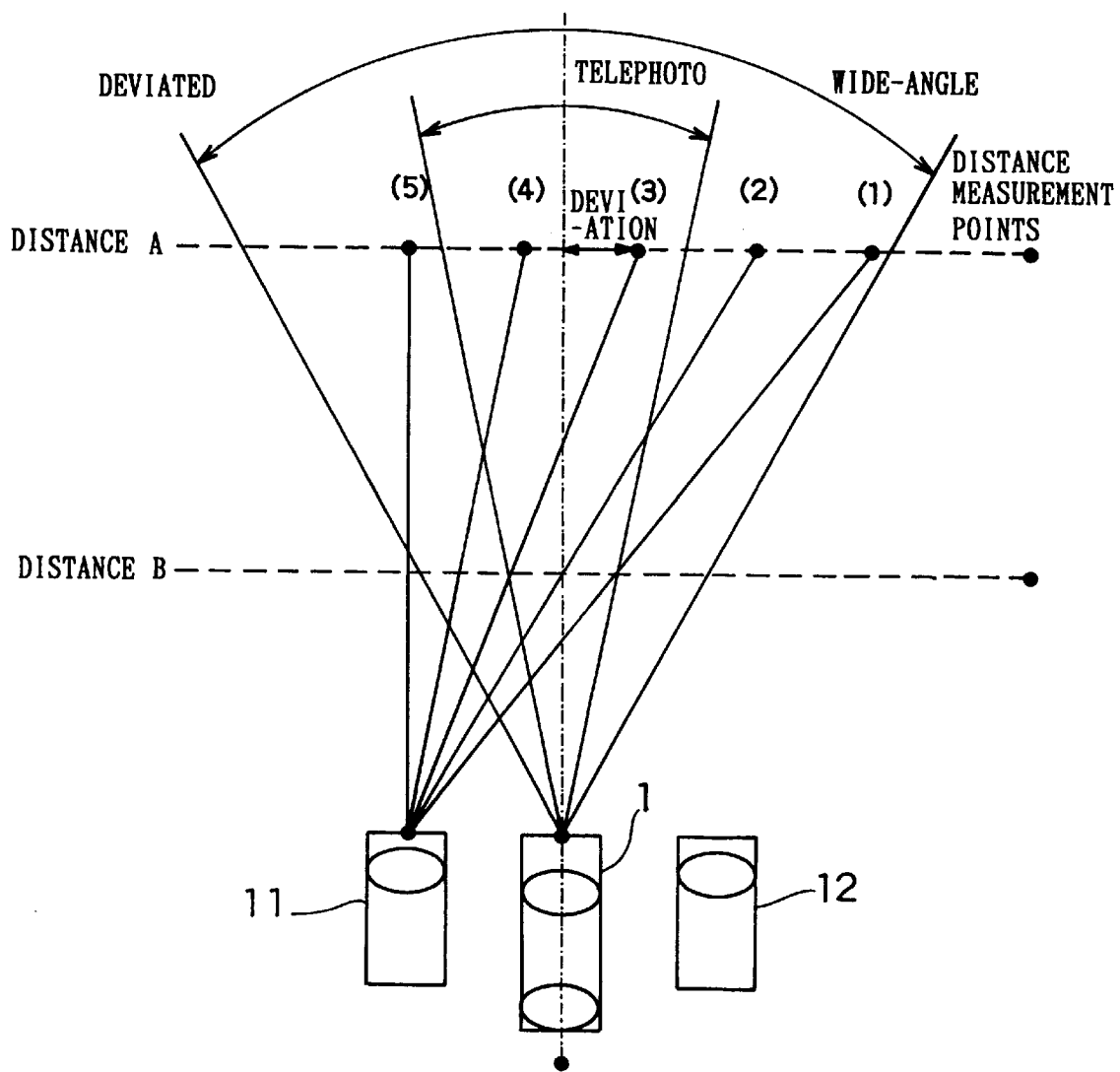
FIG. 4 is a diagram illustrating how distance measurement points are selected in accordance with the focal length and the object distance when there is a deviation.

FIG. 4 illustrates how distance measurement points are selected in accordance with the focal length and the object distance when there is a deviation. This figure shows the five light beams emitted from the light-emitter 11 to obtain distance measurement points (1) to (5) on the object when, at the distance A, there is a deviation between the central distance measurement point (3) and the center of the viewfinder 1. As shown in this figure, as zooming is performed from the wide-angle end to the telephoto end and the field of view of the viewfinder varies accordingly, and simultaneously as the object distance varies from the distance A to the distance B, the central distance measurement point and the selectable distance measurement points change as shown in Table 3 below.

TABLE 3

| Central Distance Measurement Point | | Selectable Distance Measurement Points | |
| --- | --- | --- | --- |
| | Distance | Wide-Angle End | Telephoto End |
| Deviated | A (4) | (1)–(5) | (3), (4) |
| | B (2) | (1)–(4) | (1)–(3) |

Figure 5:
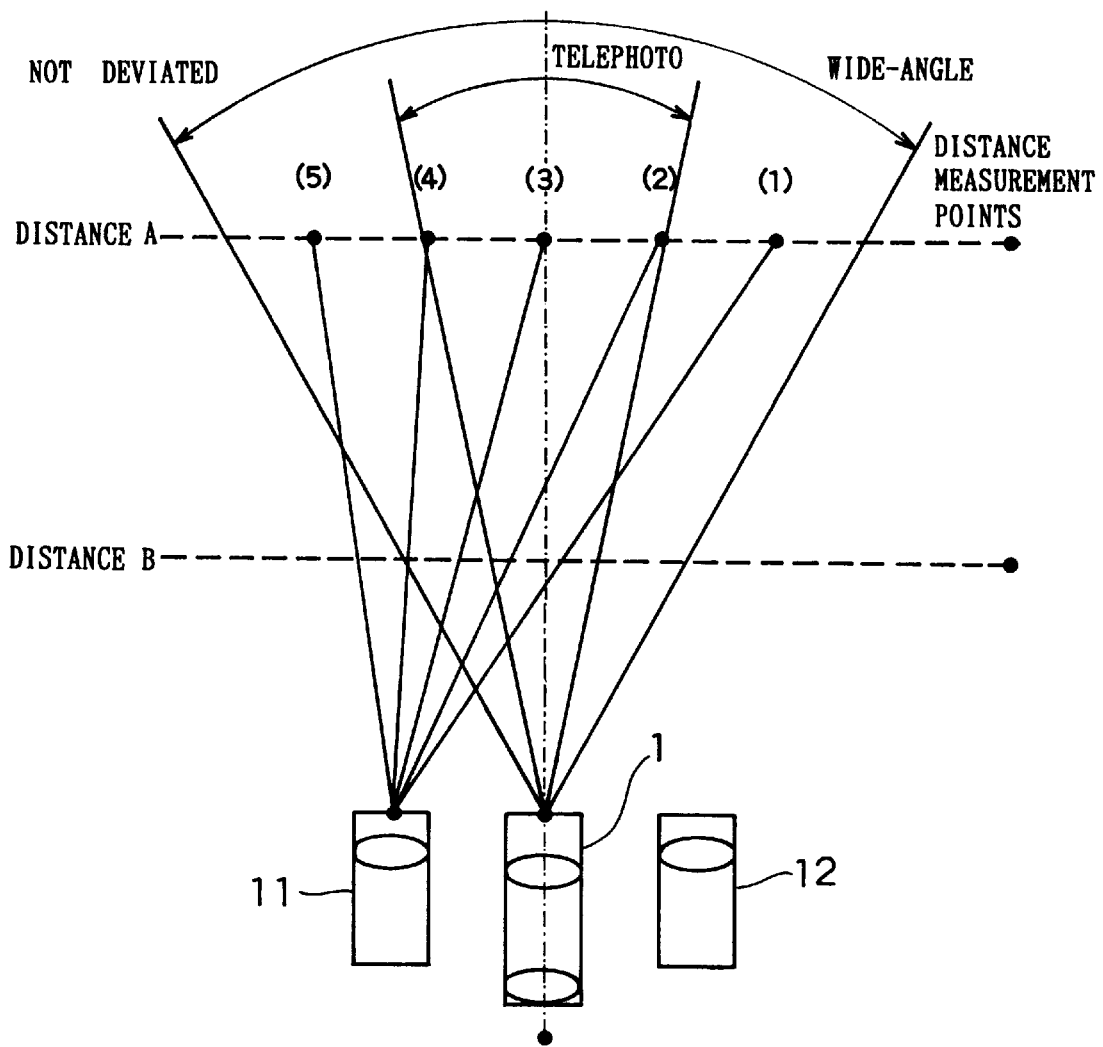
FIG. 5 is a diagram illustrating how distance measurement points are selected in accordance with the focal length and the object distance when there is no deviation.

FIG. 5 illustrates how distance measurement points are selected in accordance with the focal length and the object distance when there is no deviation. This figure shows the five light beams emitted from the light-emitter 11 to obtain distance measurement points (1) to (5) on the object when, at the distance A, there is no deviation between the central distance measurement point (3) and the center of the viewfinder 1. As shown in this figure, as zooming is performed from the wide-angle end to the telephoto end and the field of view of the viewfinder varies accordingly, and simultaneously as the object distance varies from the distance A to the distance B, the central distance measurement point and the selectable distance measurement points change as shown in Table 4 below.

TABLE 4

| Central Distance Measurement Point | | Selectable Distance Measurement Points | |
| --- | --- | --- | --- |
| | Distance | Wide-Angle End | Telephoto End |
| Not Deviated | A (3) | (1)–(5) | (2)–(4) |
| | B (1) | (1)–(4) | (1), (2) |

In these examples, by storing the positional relationship between the viewfinder and the distance measurement points in the above-mentioned memory 6, it is possible to recognize variation in their positional relationship accurately, and therefore, by selecting distance measurement points in accordance with the thus recognized variation, it is possible to focus on a point intended by the photographer. Moreover, by checking the positional relationship, storing the data related thereto, and selecting appropriate distance measurement points for individual focus detection devices, it is possible to recognize which distance measurement points are out of the viewfinder screen or out of the distance measurement frame for individual focus detection devices, and thus it is possible to perform distance measurement using as many distance measurement points as possible.

The positional relationship between the viewfinder and the distance measurement points is recognized in the following manner. For example, the deviation of the light beam relative to the center of the viewfinder as observed at the wide-angle end when the object distance is 3 m is stored in the memory. This makes it possible to calculate the positional relationship based on the relation between the focal length and the object distance as considered together with the stored deviation.

Figure 11A:
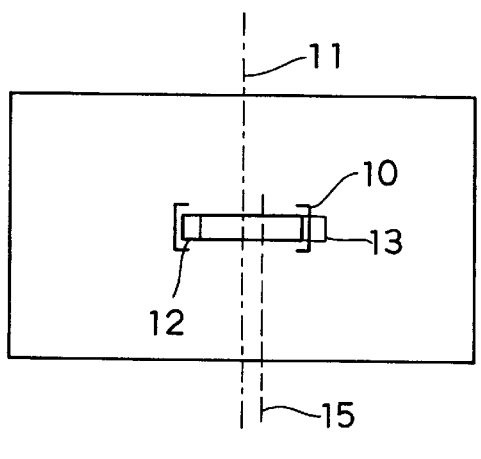
FIGS. 11A and 11B are diagrams illustrating the deviation of the distance measurement area relative to the distance measurement frame resulting from variation in the object distance.
Figure 11B:
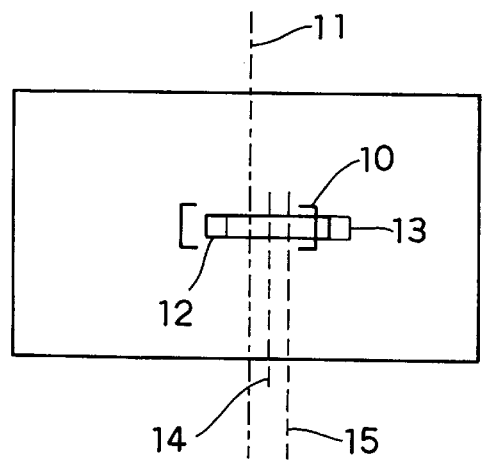
Figure 12A:
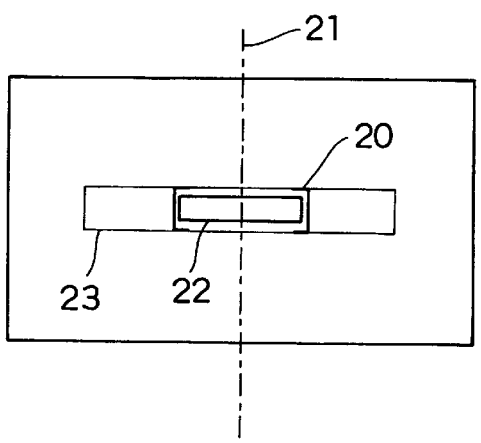
FIGS. 12A and 12B are diagrams illustrating the deviation of the distance measurement area relative to the distance measurement frame resulting from variation in the focal length.
Figure 12B:
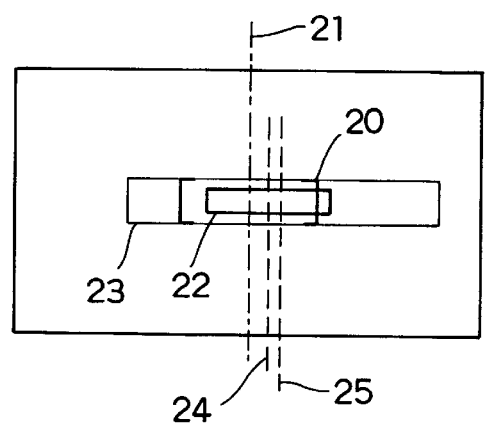

FIGS. 11A, 11B, 12A, and 12B illustrate the relationship between the distance measurement frame within the viewfinder and the distance measurement area. FIGS. 11A and 11B show the deviation of the distance measurement area relative to the distance measurement frame resulting from variation in the object distance, and FIGS. 12A and 12B show the deviation of the distance measurement area relative to the distance measurement frame resulting from variation in the focal length.

FIG. 11A illustrates a case where there is no mechanical assembly error between the viewfinder optical system and the focus detection optical system, and FIG. 11B illustrates a case where there is a mechanical assembly error. In both figures, numeral 10 represents the distance measurement frame, numeral 11 represents the center line of the distance measurement frame, numeral 12 (rectangular in thick lines) represents the distance measurement area for a predetermined object distance, numeral 13 (rectangular in fine lines) represents the distance measurement area for an object distance closer than the predetermined object distance, numeral 14 represents the center of the distance measurement area for the predetermined object distance, and numeral 15 represents the center of the distance measurement area for the closer object distance.

As shown in FIG. 11A, when there is no mechanical assembly error, at the predetermined object distance, the center of the distance measurement area coincides with the center of the distance measurement frame, but, at the closer object distance, the two centers deviate from each other due to parallax.

By contrast, as shown in FIG. 11B, when there is a mechanical assembly error, even at the predetermined object distance, the center of the distance measurement area deviates from the center of the distance measurement frame, and, at the closer object distance, the two centers deviate farther from each other.

FIG. 12A illustrates a case where there is no mechanical assembly error between the viewfinder optical system and the focus detection optical system, and FIG. 12B illustrates a case where there is a mechanical assembly error. In both figures, numeral 20 represents the distance measurement frame, numeral 21 represents the center line of the distance measurement frame, numeral 22 (rectangular in thick lines) represents the distance measurement area at the wide-angle end, numeral 23 (rectangular in fine lines) represents the distance measurement area at the telephoto end, numeral 24 represents the center of the distance measurement area at the wide-angle end, and numeral 25 represents the center of the distance measurement area at the telephoto end.

As shown in FIG. 12A, when there is no mechanical assembly error, the center of the distance measurement area coincides with the center of the distance measurement frame regardless of the variation in the focal length.

By contrast, as shown in FIG. 12B, when there is a mechanical assembly error, the center of the distance measurement area deviates from the center of the distance measurement frame both at the wide-angle end and at the telephoto end. Whereas the deviation at the wide-angle end is small, the deviation at the telephoto end is greater because the deviation is enlarged as the focal length is varied from the wide-angle end to the telephoto end.

Figure 6:
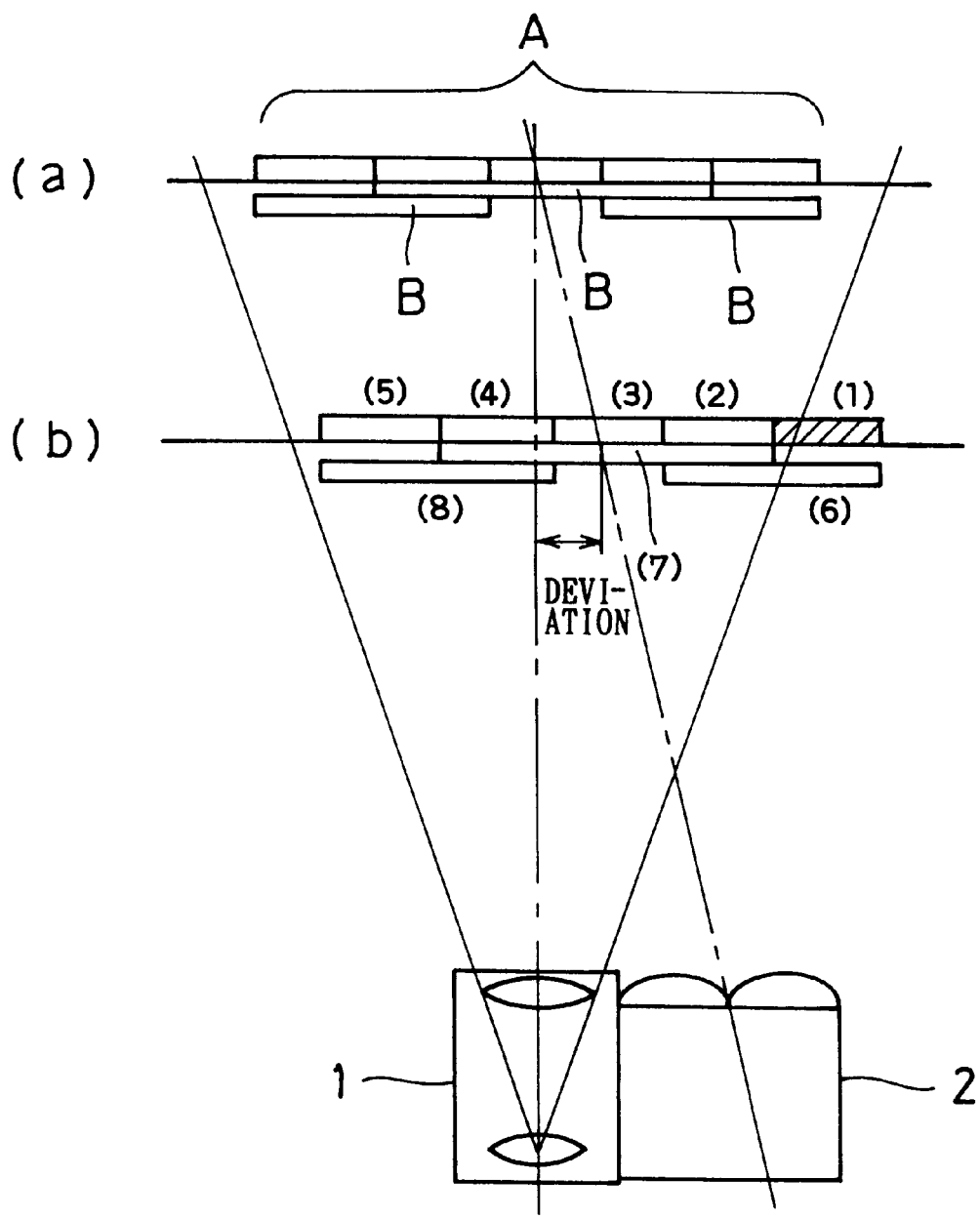
FIG. 6 is a diagram illustrating how distance measurement areas are selected in the passive method.

FIG. 6 illustrates an example of the passive method. In this case, as shown in the figure, the distance measurement unit 2 designed for the passive method has a group of distance measurement blocks A consisting of a plurality of line sensors and another group of distance measurement blocks B consisting of a plurality of line sensors covering larger areas than those composing the distance measurement blocks A. In this example, when all of the distance measurement blocks fall within the field of view of the viewfinder 1 as shown at (a) of FIG. 6, they are all selectable; on the other hand, even when part of the distance measurement blocks falls out of the field of view as the result of zooming or variation in the object distance, for example, even when a block (1) among the distance measurement blocks A becomes unselectable as shown at (b) of FIG. 6, if a substantial part of the corresponding block (6) among the distance measurement blocks B, which has a wider area, falls within the field of view, it is regarded as selectable.

In this way, in cases where a distance measurement unit of the passive type is used, even when one or more among the normal-size distance measurement areas of the above distance measurement blocks A fall out of the viewfinder screen (or the distance measurement frame) and are found to be reliable from a viewpoint of distance measurement but unselectable, all of the wide-size distance measurement areas of the above distance measurement blocks B are left selectable. This helps increase the probability that distance measurement will be possible.

The reliability of a distance measurement block from a viewpoint of distance measurement is judged in one of the following ways. One way is to check whether the contrast of the object is sufficiently high or not. Specifically, the contrast value in each block is calculated on the basis of the waveform of the output signal of the line sensor, and, if the calculated contrast value is greater than a predetermined value, that block is judged to be reliable. Another way is to check the degree of coincidence by calculating correlation. Specifically, the waveforms of the output signals of the right and left sensors are compared, and, while the position where the two waveforms substantially coincide is regarded as representing the result of distance measurement, the reliability is evaluated according to the degree of coincidence.

Figure 7:
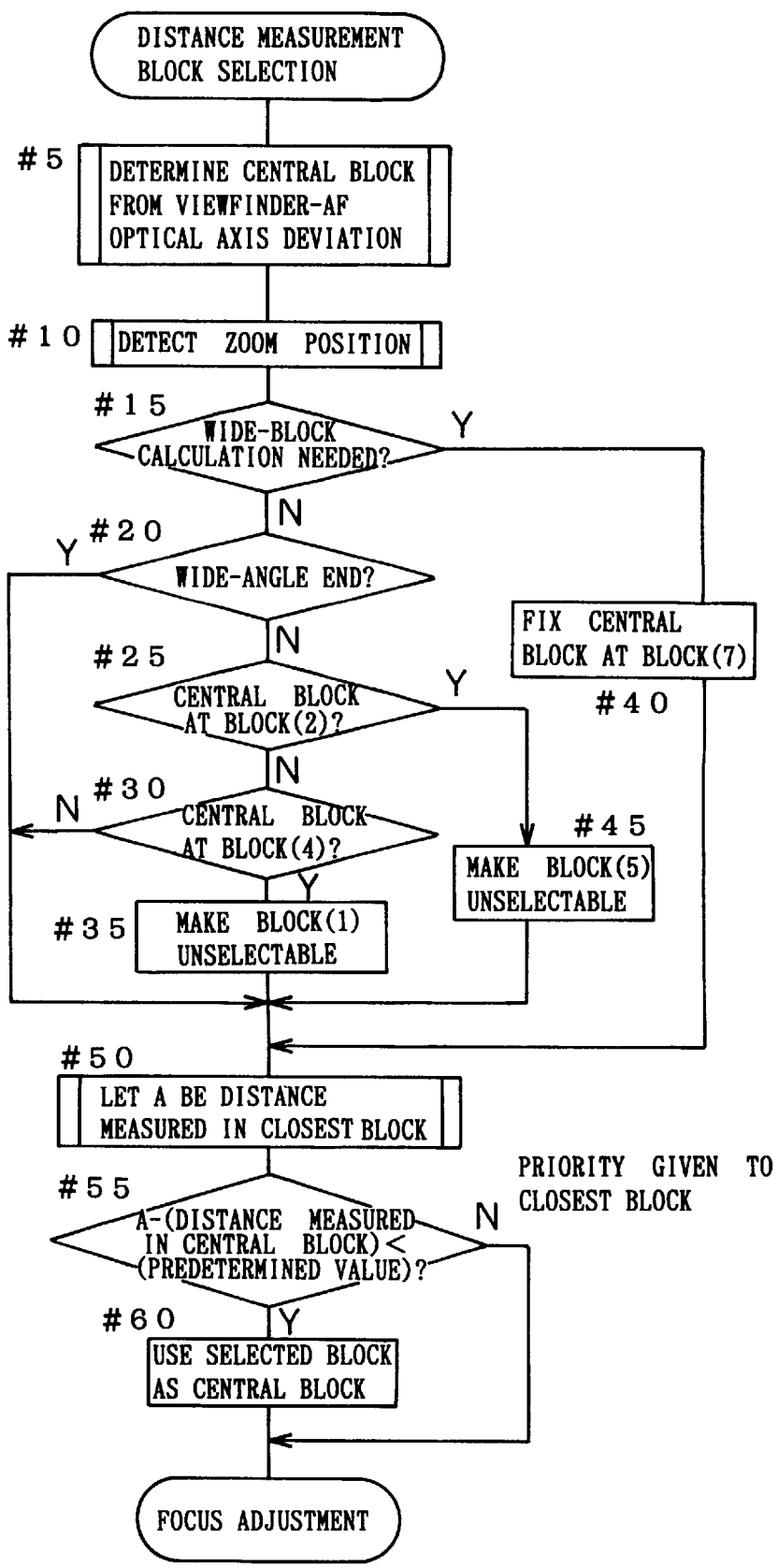
FIG. 7 is a flow chart illustrating the sequence of operations performed to select distance measurement blocks in accordance with the focal length.

FIG. 7 shows a flow chart of the sequence of operations performed to select distance measurement blocks in accordance with the focal length in the above-described example adopting the passive method. As shown in this figure, when selection of distance measurement blocks is started, first, in step #5, the central block is determined on the basis of the deviation of the optical axis of the distance measurement unit 2 relative to the viewfinder 1, and then, in step #10, the current zoom position is detected. Next, in step #15, whether wide-block calculation using the distance measurement blocks B is necessary or not is checked, and, if it is not necessary, the operation sequence proceeds to step #20, where whether the current zoom position is the wide-angle end or not is checked.

When the current zoom position is not the wide-angle end, the operation sequence proceeds to step #25, where whether the central block is the block (2) or not is checked. If it is not the block (2), the operation sequence proceeds to step #30, where whether the central block is the block (4) or not is checked. If it is the block (4), the operation sequence proceeds to step #35, where the block (1) is labeled as unselectable. Then, in step #50, the distance to the closest block is assumed to be equal to A, and then, in step #55, whether the distance to the central block differs from A by less than a predetermined value or not is checked, and, if it is less than the predetermined value, the operation sequence proceeds to step #60, where the selected block is regarded as the central block and focus adjustment is started.

In step #15 mentioned above, if wide-block calculation is necessary, the operation sequence proceeds to step #40, where the central block is fixed at the block (7) among the distance measurement blocks B, and then the operation sequence proceeds to step #50. In step #20 mentioned above, if the current zoom position is the wide-angle end, the operation sequence proceeds to step #50. In step #25 mentioned above, if the central block is the block (2), the operation sequence proceeds to step #45, where the block (5) is labeled as unselectable, and then the operation sequence proceeds to step #50. In step #30 mentioned above, if the central block is not the block (4), the operation sequence proceeds to step #50. In step #55 mentioned above, if the difference is not less than the predetermined value, focus adjustment is started with priority given to the closest block.

Figure 8:
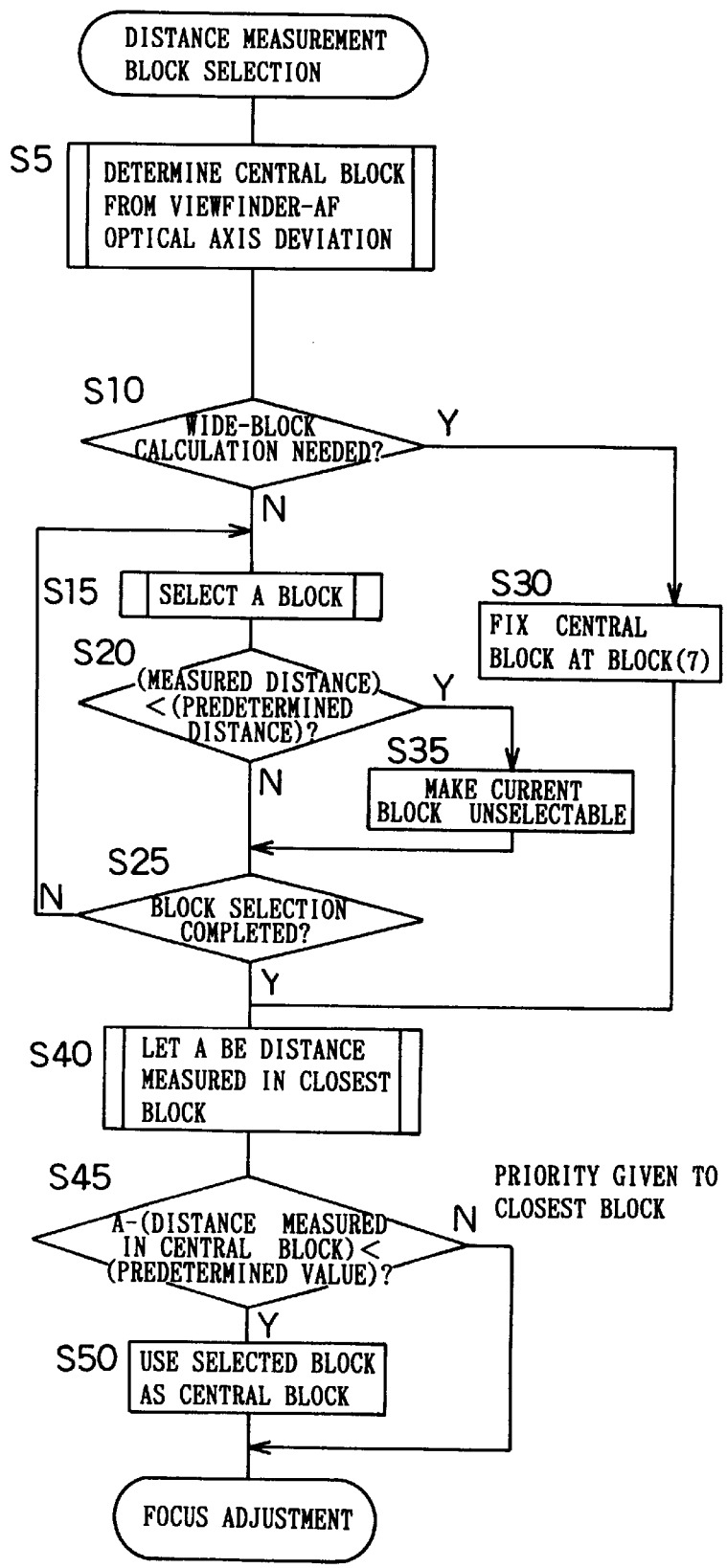
FIG. 8 is a flow chart illustrating the sequence of operations performed to select distance measurement blocks in accordance with the object distance.

FIG. 8 shows a flow chart of the sequence of operations performed to select distance measurement blocks in accordance with the object distance. As shown in this figure, when selection of distance measurement blocks is started, first, in step S5, the central block is determined on the basis of the deviation of the optical axis of the distance measurement unit 2 relative to the viewfinder 1. Next, in step S10, whether wide-block calculation using the distance measurement blocks B is necessary or not is checked, and, if it is not necessary, the operation sequence proceeds to step S15, where a block is tentatively selected.

Then, in step S20, whether the distance measured in the tentatively selected block is less than a predetermined distance or not is checked. If it is not less than the predetermined distance, the operation sequence proceeds to step S25, where whether block selection is completed or not is checked. If block selection is completed, the operation sequence proceeds to step S40, where the distance to the closest block is assumed to be equal to A, and then, in step S45, whether the distance to the central block differs from A by less than a predetermined value or not is checked, and, if it is less than the predetermined value, the operation sequence proceeds to step S50, where the selected block is regarded as the central block and focus adjustment is started.

In step S10 mentioned above, if wide-block calculation is necessary, the operation sequence proceeds to step S30, where the central block is fixed at the block (7) among the distance measurement blocks B, and then the operation sequence proceeds to step S40. In step S20 mentioned above, if the measured distance is less than the predetermined distance, the operation sequence proceeds to S35, where the tentatively selected block is labeled as unselectable, and the operation sequence proceeds to step S25. In step S25 mentioned above, if block selection is not completed, the operation sequence returns to step S15. In step S45 mentioned above, if the difference is not less than the predetermined value, focus adjustment is started with priority given to the closest block.

In this way, in selecting distance measurement blocks in accordance with the focal length or the object distance, the blocks that are located outside the viewfinder screen or the distance measurement frame are made unselectable depending on given conditions. Considering that these blocks serve exactly as distance measurement points, this selecting method can be applied also to the infrared active method mentioned earlier. In addition, the distance measured in the central block is compared with the distance measured in the closest block so that, if their difference is less than a predetermined value, the tentatively selected block will be regarded as the central block, and, if not, the closest block will be given priority. This method can also be applied to the infrared active method mentioned earlier.

Figure 9A:
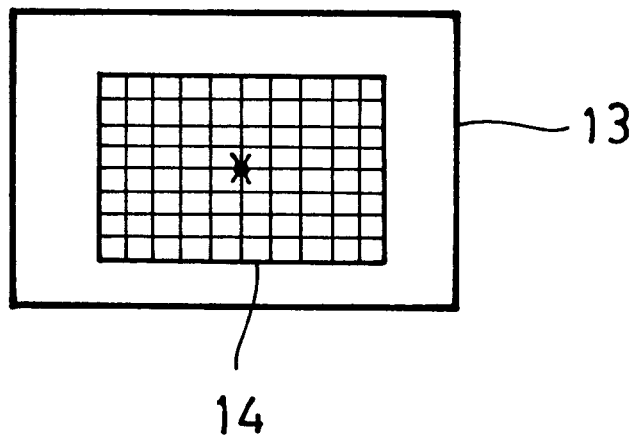
FIGS. 9A and 9B are diagrams illustrating the positional relationship between the light-sensing areas of the two-dimensional sensor and the viewfinder screen.
Figure 9B:
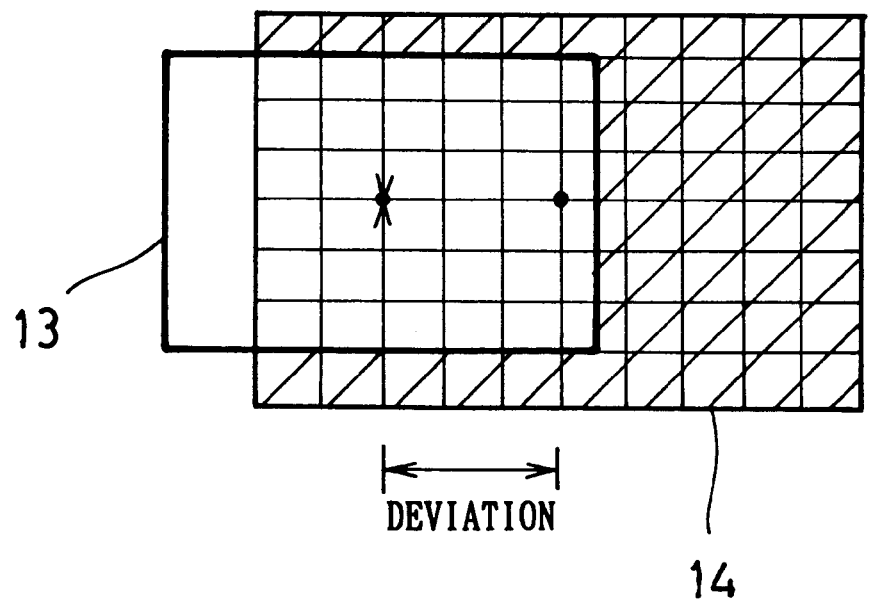

FIGS. 9A and 9B illustrate the positional relationship between the light-sensing areas of the two-dimensional sensor and the viewfinder screen. In the passive method, when the light-sensing areas 14, which serve as distance measurement elements, of the light sensor composed of a two-dimensional array of picture elements and the viewfinder screen 13 are so arranged that, at the wide-angle end, the center of the light-sensing areas marked as • coincides with the center of the view finder marked as × as shown in FIG. 9A, then, at the telephoto end, the center of the light-sensing areas deviates from the center of the viewfinder, and thus part of the light-sensing areas 14 get out of the viewfinder screen 13 as shown in FIG. 9B. In this case, the hatched areas that are located outside are regarded as unselectable areas.

Figure 10:
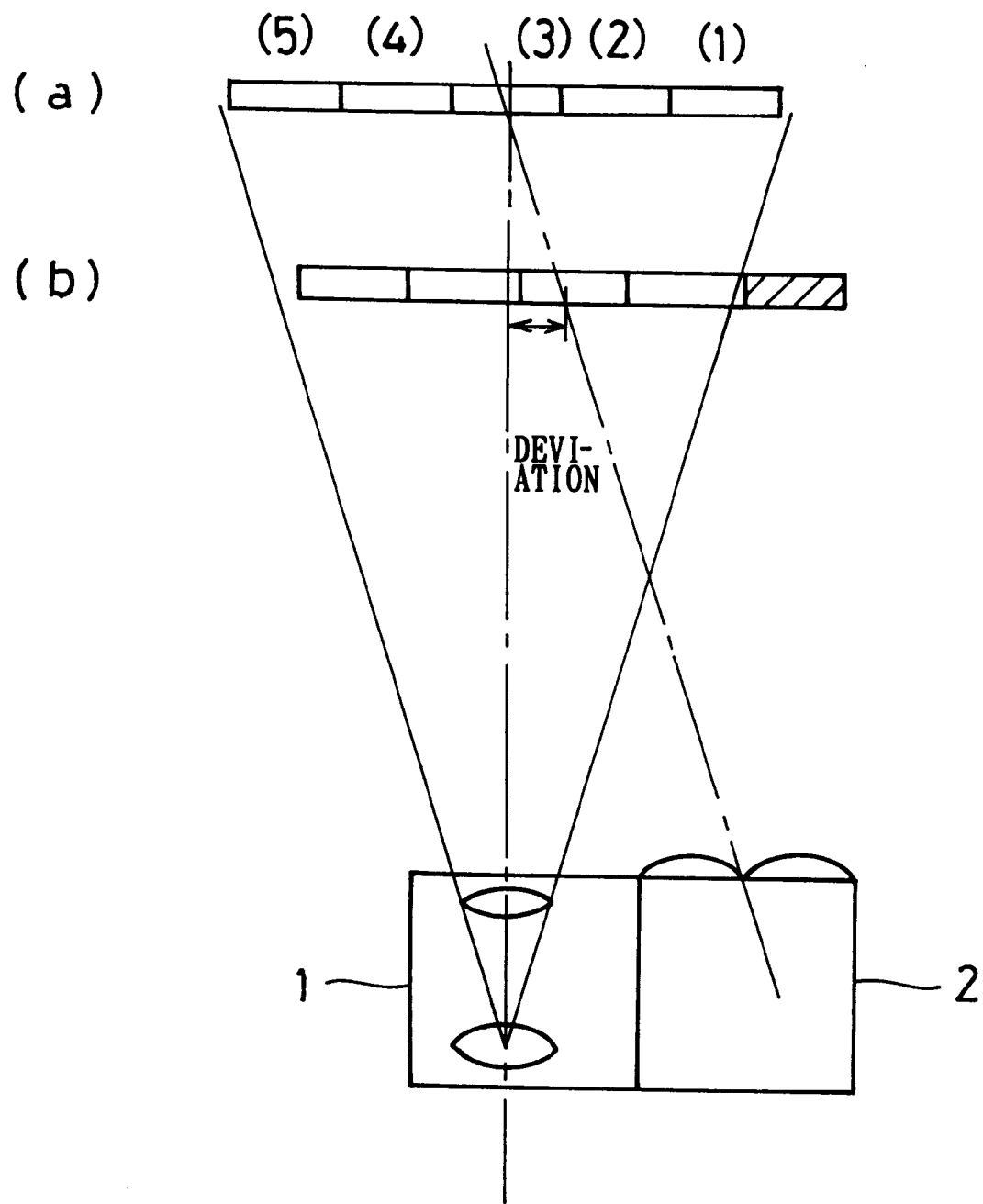
FIG. 10 is a diagram illustrating how the distance measurement device is used simultaneously as a photometry device.

FIG. 10 illustrates how the distance measurement device is used simultaneously as a photometry device. This figure shows an example based on the passive method. In cases where the deviation of the optical axis of the distance measurement unit 2 relative to the viewfinder 1 sometimes causes all the distance measurement blocks to fall within the field of view of the viewfinder 1 as shown at (a) of FIG. 10 and other times, for example according as the object distance varies, causes the hatched block (1) to get out of the field of view as shown at (b) of FIG. 10, it is possible to determine the brightness of the object with higher accuracy by ignoring the photometry result obtained in a block, like the block (1) above, located outside the viewfinder block.

As described above, according to the present invention, it is possible to recognize the positional relationship between the viewfinder screen and the distance measurement points accurately, and thus it is possible to focus on a point intended by the photographer.

Moreover, according to the present invention, by checking the positional relationship, storing the data related thereto, and selecting appropriate distance measurement points for individual focus detection devices, it is possible to recognize which distance measurement points are out of the viewfinder screen or out of the distance measurement frame for individual focus detection devices, and thus it is possible to perform distance measurement using as many distance measurement points as possible.

Moreover, according to the present invention, in cases where a distance measurement unit of the passive type is used, even when one or more among the normal-size distance measurement areas fall out of the viewfinder screen (or the distance measurement frame) and are found to be reliable from a viewpoint of distance measurement but unselectable, all of the wide-size distance measurement areas are left selectable. This helps increase the probability that distance measurement will be possible. Furthermore, by the use of a light sensor having a two-dimensional array of picture elements, it is possible to perform distance measurement without fail in a wider distance range.

Moreover, according to the present invention, in cases where a distance measurement device is used also as a photometry device, by ignoring the photometry result obtained in a block located outside the viewfinder screen, it is possible to determine the brightness of the object with higher accuracy.

What is claimed is:

1. A distance measurement device comprising:
   a taking lens;
   a viewfinder;
   a plurality of distance measuring elements for performing distance measurement in a plurality of areas on an object;
   a memory for storing a mechanical assembly deviation between said viewfinder and said distance measuring elements;
   a selector for selecting one of distances measured in said plurality of areas in accordance with said positional relationship stored in said memory; and
   a controller for adjusting focus of said taking lens in accordance with the distance selected by said selector.

2. A distance measuring device as claimed in claim 1, wherein, when selecting one of the distances measured in said plurality of areas, said selector also takes into consideration values of those distances themselves.

3. A distance measuring device as claimed in claim 2, wherein, when any of the distances measured in said plurality of areas is smaller than a predetermined value, said selector does not select that distance, on the assumption that it has been measured in a distance measurement area located outside the field of view of said viewfinder.

4. A distance measuring device as claimed in claim 2, wherein, when the distance measured in the distance measurement area located at the center of the field of view of said viewfinder differs from a closest distance measured in said plurality of areas by less than a predetermined value, said selector selects the distance measured in the distance measurement area located at the center of the field of view of the viewfinder.

5. A distance measuring device as claimed in claim 1, wherein, when selecting one of the distances measured in said plurality of areas, said selector also takes into consideration a focal length of said taking lens.

6. A distance measuring device as claimed in claim 5, wherein, when said focal length is greater than a predetermined value, said selector does not select any distance measured in a distance measurement area located outside the field of view of said viewfinder.

7. A distance measuring device as claimed in claim 1, wherein said distance measuring elements are grouped into a plurality of first distance measuring blocks and second distance measuring blocks each larger than any single first distance measuring block, and output a distance separately for each of those blocks.

8. A distance measuring device as claimed in claim 7, wherein, even when part of said first distance measuring blocks are located outside the field of view of said viewfinder, said selector is allowed to select that one of said second distance measuring blocks which includes said part of said first distance measuring blocks.

9. A distance measuring device as claimed in claim 1, wherein said distance measuring elements are arranged in a two-dimensional array.

10. A distance measuring device as claimed in claim 1, wherein said distance measuring elements also output photometry results.

11. A distance measuring device as claimed in claim 10, wherein said distance measuring device does not select the photometry result obtained in a distance measurement area located outside the field of view of said viewfinder.

12. A focus detection device comprising:
    a taking lens;
    a viewfinder;
    a plurality of focus detection elements for performing focus detection in a plurality of areas on an object;
    a memory for storing a mechanical assembly deviation between said viewfinder and said focus detection elements;
    a selector for selecting one of focus detection results obtained in said plurality of areas in accordance with said positional relationship stored in said memory; and
    a controller for adjusting focus of said taking lens in accordance with the focus detection result selected by said selector.

* * * * *